C. GLECKLER.
SELF SETTING TRAP.
APPLICATION FILED APR. 4, 1914.

1,115,809.

Patented Nov. 3, 1914.
2 SHEETS—SHEET 1.

Fig. 1.

Fig. 2.

Witnesses
Robert M. Sutphen
A. L. Hurd

Inventor
C. GLECKLER
By Watson E. Coleman
Attorney

C. GLECKLER.
SELF SETTING TRAP.
APPLICATION FILED APR. 4, 1914.
1,115,809.
Patented Nov. 3, 1914.
2 SHEETS—SHEET 2.
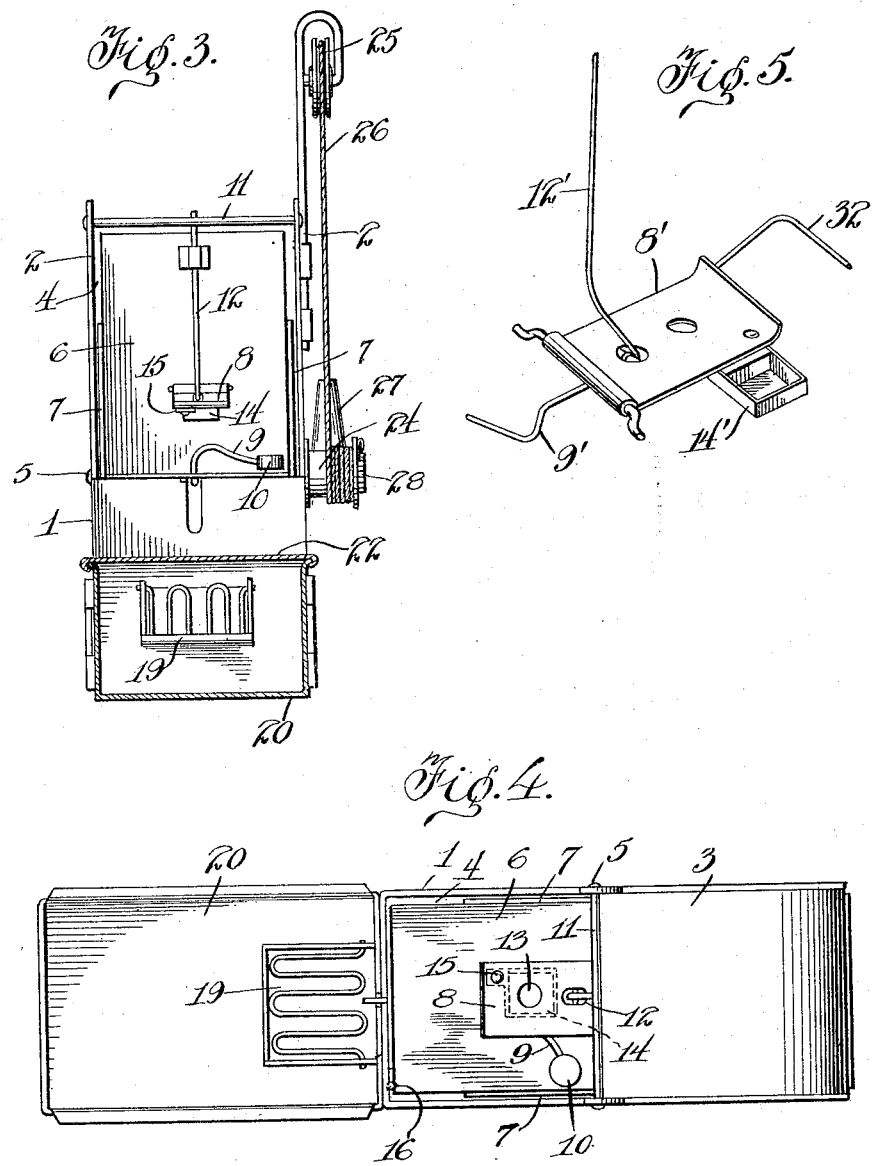
Witnesses
Robert M. Sutphen
A. L. Hind
Inventor
C. GLECKLER
By Watson E. Coleman
Attorney

UNITED STATES PATENT OFFICE.

CHRISTOPH GLECKLER, OF EARLHAM, IOWA.

SELF-SETTING TRAP.

1,115,809.   Specification of Letters Patent.   Patented Nov. 3, 1914.

Application filed April 4, 1914.   Serial No. 829,546.

*To all whom it may concern:*

Be it known that I, CHRISTOPH GLECKLER, a citizen of the United States, residing at Earlham, in the county of Madison and State of Iowa, have invented certain new and useful Improvements in Self-Setting Traps, of which the following is a specification, reference being had to the accompanying drawings.

This invention relates to improvements in traps, and more particularly to that class of traps which are self-setting.

An object of this invention is the provision of a trap which comprises a receptacle having a partially open top, the receptacle having a rotary member mounted therein which is provided with a plurality of radially extending doors to close the partially open top of the trap, each of the doors carrying a treadle to which a releasing trigger is connected so that the member may revolve upon depression of the treadle to throw the animal disposed upon the door into the body of the receptacle.

A further object of this invention is the provision of a treadle of the above character, which is provided with an opening therein, the treadle having a bait box pivotally connected thereto which is adapted to be swung beneath the treadle so that the opening in the treadle communicates with the interior of the bait box, so that the animals or birds attracted by the bait can readily see and reach the same but are prevented from moving the bait from the box, owing to the restricted size of the opening communicating therewith, whereby the same bait may be utilized to attract a number of animals or birds.

Another object of this invention is the provision of a trap which may be supported on top of an open receptacle containing liquid, so that animals caught by the revolving member of the trap may be precipitated directly into the liquid, so that they are immediately drowned as soon as caught.

A still further object of this invention is the provision of a trap which may be provided with interchangeable treadles so as to render the same equally effective in catching animals or birds.

With these and other objects in view, my invention consists in the novel construction, combination, and arrangement of parts to be hereinafter more fully described, claimed, and illustrated in the accompanying drawings, in which, Figure 1 is a side elevation of my improved trap; Fig. 2 is a longitudinal section thereof; Fig. 3 is a vertical section thereof; Fig. 4 is a top plan view; and Fig. 5 is a perspective view of an alternative form of treadle.

Referring more particularly to the drawings, the numeral 1 designates a receptacle, the side walls of which are extended upwardly at one end of the receptacle, as at 2, the receptacle having a removable top wall 3 removably engaged with the upper edges of the extended portions 2 of the side walls, so that an opening 4 is formed in the top of the receptacle. Rotatably mounted in the receptacle intermediate of its ends, is a shaft 5, and connected to the shaft are a plurality of radially extending trap doors 6 which are preferably four in number, the doors being adapted to successively close the opening 4 in the receptacle. Mounted on the shaft and secured to the opposite side edges of the doors 6 is a pair of side plates 7 which are adapted to prevent animals from mounting upon the doors from the opposite sides of the trap. Pivotally connected to one face of each of the doors 6 is a treadle plate 8, each of the treadles having a weight arm 9 extending from its inner end through the door, the free end of each weight arm being offset to normally extend in a parallel plane with the door, and has a weight 10 connected to its extremity, the weights normally maintaining the treadles in a position at right angles to the doors.

A stop rod 11 is connected at its opposite ends to the upper edges of the upwardly extended portions 2 of the side walls above the shaft 5, and a trigger 12 is pivotally connected at one end to each of the treadles 8, the triggers being slidably connected to the doors 6, so that the free ends thereof are disposed above the free edges of the doors in a position for engagement with the stop rod 11 to prevent rotation of the shaft 5 until the treadle is depressed to move the trigger from engagement with the rod 11. Each of the treadles is provided with an opening 13, and a bait box 14 is provided for pivotal connection to each of the treadles.

The bait boxes are formed with a laterally extending flange 15 at one end, the flange of each box being pivotally connected to one of the treadles adjacent the opening therein, whereby the bait box may be swung to one side of the treadle so that suitable bait may be inserted into the box, whereupon the bait box may be moved to a position so that the opening 13 in the treadle communicates with the interior of the box so that the bait is disposed within the view and within reach of the animals to be caught in the trap. Connected at one end to the inner end wall of the receptacle is a spring latch bar 16, the upper end of the latch bar projecting through the opening 4 in the top of the receptacle, and having a shoulder 17 formed thereon for engagement with the door 6 which is disposed in a position to close the opening to prevent reverse rotation of the shaft 5.

The inner end wall of the receptacle is provided with an outlet opening 18 which communicates with a chute 19 connected to the opposing end wall of a magazine 20 which is detachably connected to the receptacle 1, so that the animals which are caught in the receptacle may pass into the magazine. The chute 19 is provided with a gravitating gate 21 which may be lifted so that they may pass from the chute to the magazine, the gate being positioned in such an incline, that reëntrance of the animals from the magazine to the receptacle is prevented. The magazine 20 is provided with a sliding cover 22 and a plurality of openings 23 are formed in the walls of the magazine so that rays of light may enter the magazine to attract the animals confined in the receptacle so that the same will quickly pass from the receptacle into the magazine.

Rotatably mounted on one end of the shaft 5 on one side of the receptacle is a drum 24, and suitably supported upon one of the side walls of the receptacle above the drum is a pulley 25, one end of a cord or rope 26 being wound upon the drum, the other end of the cord extending upwardly and over the pulley 25, a weight 27 being connected to the free end of the cord. A ratchet wheel 28 is secured to the extremity of the shaft 5, and a spring pressed pawl 29 is pivotally connected to the drum, the pawl being adapted to engage the teeth of the ratchet wheel to prevent rotation of the drum in one direction. It will be seen that, upon depression of one of the treadles 8 to release the trigger 12 from the stop rod 11, the weight of the animal upon the door which closes the opening 4 is sufficient to revolve the shaft, and the weight 27 which is connected to the drum on the end of the shaft serves to increase the speed of rotation of the shaft so that the animal disposed upon the door will be quickly precipitated into the receptacle. If desired, the bottom of the receptacle 1 may be provided with an opening 30 below the opening 4 in the top of the receptacle, which is normally closed by the swinging door 31 so that the receptacle may be placed upon the upper edges of a barrel (not shown) containing water, and when the receptacle is in this position, the door 31 is swung to one side so that the animals when caught may be dropped through the opening into the liquid contained in the barrel and drowned.

In Fig. 5 of the drawings, I have illustrated an alternative form of treadle 8', the treadle being provided with an outwardly extending perch rod or rest 32, the outer end of the rod 32 being offset so that the same is disposed directly in advance of the treadle, and spaced therefrom to provide a suitable rest for sparrows, or other small birds which it may be desired to trap. It will be understood that when it is desired to trap small birds, each of the doors 6 is provided with a treadle 8' having a perch rod 32 connected thereto, and each of the treadle plates is provided with a bait box 14', trigger 12', and weight arm 9', which are connected to the treadle plate in the manner heretofore described.

It will be understood that the trap may be used to catch rats and mice without the weight 27 being connected to the shaft 5, as the weight of the rodent upon one of the doors 6 is sufficient to force the door downwardly upon disengagement of the trigger from the stop rod 11 to precipitate the rodent into the body of the receptacle. When the treadles 8' are used in connection with the trap to catch sparrows or other small birds, the weight 27 must necessarily be connected to the shaft 5 so that when the trigger is removed from the stop rod, the revoluble member will be quickly rotated so that the door 6 above the treadle 8' upon which the bird is disposed, will strike the bird and force it downwardly into the trap. It will be seen that by placing larger pieces of bait within the bait boxes 14 than can be removed through the openings 13 in the treadles, the bait will last a comparatively long time and render frequent replenishing of the bait unnecessary. It is to be understood, that the shaft 5 and the door 6 may be mounted in a rectangular frame, so that if it is desired to drown the animals as quickly as caught, the frame may be disposed over an open receptacle such as a barrel containing water, into which the animals will be precipitated through the frame, to drown them.

Having thus fully described my invention, what I desire to secure and claim by Letters Patent, is:—

1. A trap comprising a frame, a stop rod connected at its opposite ends within the frame, a shaft rotatably mounted in the frame below the stop rod, a plurality of radially extending doors connected to the shaft, a treadle connected to each of the doors, triggers carried by the treadles and being slidably connected to the doors and extending longitudinally thereof, a weight arm connected to each of the treadles adjacent its inner end, said weight arms projecting through the doors and having their free ends directed inwardly to normally extend in a parallel plane with the doors, a weight connected to the free extremity of each arm, the free end of the weight arm connected to each treadle being adapted to move to a vertical position as the door to which the treadle is connected moves upwardly above said shaft, whereby to move the free end of the trigger beyond the edge of the door in engagement with the stop rod, to prevent rotation of the shaft until depression of the treadle.

2. A trap comprising a frame, a shaft rotatably mounted in the frame, a stop rod mounted in the frame above the shaft, a plurality of doors extending radially from the shaft, treadles pivotally connected to the doors, means carried by the doors for successive engagement with the stop rod whereby to prevent rotation of the shaft in one direction, each of said treadles having an opening formed therein, and a bait box connected to each of the treadles, the openings in said treadles being adapted to communicate with the interior of said box when the same are in operative position.

3. A trap comprising a frame, a shaft rotatably mounted in said frame, a plurality of doors extending radially from said shaft, a cover for closing substantially one-half of the top of said frame, a stop rod mounted in said frame, treadles pivotally connected to said doors, triggers carried by said treadles for successive engagement with the stop rod, each of said treadles having an opening formed therein, and a swinging bait box connected to each of said treadles, the openings in said treadles being adapted to communicate with the interior of said bait boxes, as and for the purpose described.

In testimony whereof I hereunto affix my signature in the presence of two witnesses.

CHRISTOPH GLECKLER.

Witnesses:
DAVID FINDLAY,
HARRY W. HILL.

---

Copies of this patent may be obtained for five cents each, by addressing the "Commissioner of Patents, Washington, D. C."